(12) United States Patent
Moon et al.

(10) Patent No.: US 9,900,531 B2
(45) Date of Patent: Feb. 20, 2018

(54) PHOTOGRAPHING APPARATUS AND METHOD FOR THE LIGHT LEAKAGE CORRECTION

(71) Applicant: SAMSUNG ELECTRONICS CO., LTD., Suwon-si (KR)

(72) Inventors: Jae-joon Moon, Anyang-si (KR); Il-do Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 15/001,606

(22) Filed: Jan. 20, 2016

(65) Prior Publication Data

US 2016/0227136 A1     Aug. 4, 2016

(30) Foreign Application Priority Data

Feb. 2, 2015   (KR) .................. 10-2015-0016019

(51) Int. Cl.
*H04N 5/217*      (2011.01)
*H04N 5/359*      (2011.01)
(Continued)

(52) U.S. Cl.
CPC ............. *H04N 5/359* (2013.01); *H04N 5/345* (2013.01); *H04N 5/3456* (2013.01);
(Continued)

(58) Field of Classification Search
CPC .... H04N 5/357; H04N 5/3653; H04N 5/2176; H04N 5/2175; H04N 5/359; H04N 1/58; H04N 1/409
(Continued)

(56) References Cited

U.S. PATENT DOCUMENTS 7,532,240 B2   5/2009   Chiba et al.
8,648,939 B2   2/2014   Okuno
(Continued)

FOREIGN PATENT DOCUMENTS

JP   2005-328421 A   11/2005
JP   2012-034354 A   2/2012
(Continued)

OTHER PUBLICATIONS

Communication dated Apr. 8, 2016, issued by the European Patent Office in counterpart European Patent Application No. 16153573.7.
(Continued)

*Primary Examiner* — Kelly L Jerabek
(74) *Attorney, Agent, or Firm* — Sughrue Mion, PLLC

(57) ABSTRACT

An photographing apparatus includes: an image sensor that includes a plurality of pixels and is configured to perform a first readout on charges stored in a group of pixels among the plurality of pixels at a first readout time and perform a second readout on charges stored in the plurality of pixels, including the group of pixels, at a second readout time; and an image processor configured to detect a pixel in which a light leakage has occurred of among the plurality of pixels based on at least one of a value the first readout charges and a value of the second read out charges, and perform a correction on the detected pixel to generate an image.

23 Claims, 14 Drawing Sheets

(51) Int. Cl.
*H04N 5/345* (2011.01)
*H04N 5/3745* (2011.01)
*H04N 5/351* (2011.01)
*H04N 5/378* (2011.01)
*H04N 9/64* (2006.01)

(52) U.S. Cl.
CPC ............. *H04N 5/351* (2013.01); *H04N 5/378* (2013.01); *H04N 5/37452* (2013.01)

(58) Field of Classification Search
USPC .................................................. 348/241–251
See application file for complete search history.

(56) References Cited

U.S. PATENT DOCUMENTS

| | | | |
|---|---|---|---|
| 8,885,065 B2 | 11/2014 | Lee et al. | |
| 2009/0122165 A1* | 5/2009 | Kinoshita | H04N 5/359 348/241 |
| 2010/0034481 A1* | 2/2010 | Forutanpour | H04N 5/367 382/275 |
| 2010/0073524 A1* | 3/2010 | Tu | H04N 5/361 348/243 |
| 2010/0134660 A1* | 6/2010 | Yamauchi | H04N 9/045 348/247 |
| 2011/0019038 A1 | 1/2011 | Okuno | |
| 2012/0002090 A1 | 1/2012 | Aoki et al. | |
| 2012/0025280 A1* | 2/2012 | Narui | H01L 27/14614 257/292 |
| 2012/0050586 A1* | 3/2012 | Kanemitsu | H04N 5/3675 348/246 |
| 2012/0206635 A1* | 8/2012 | Kikuchi | H04N 5/359 348/308 |
| 2013/0083213 A1* | 4/2013 | Kawada | H04N 5/361 348/222.1 |
| 2013/0188079 A1 | 7/2013 | Sakano | |
| 2014/0239161 A1 | 8/2014 | Meynants et al. | |
| 2015/0271461 A1* | 9/2015 | Hayashi | H04N 9/07 348/223.1 |

FOREIGN PATENT DOCUMENTS

| | | |
|---|---|---|
| JP | 2014-023114 A | 2/2014 |
| KR | 10-2011-0133355 A | 12/2001 |

OTHER PUBLICATIONS

Communication dated May 2, 2016, issued by the European Patent Office in counterpart European Patent Application No. 16153573.7.

* cited by examiner

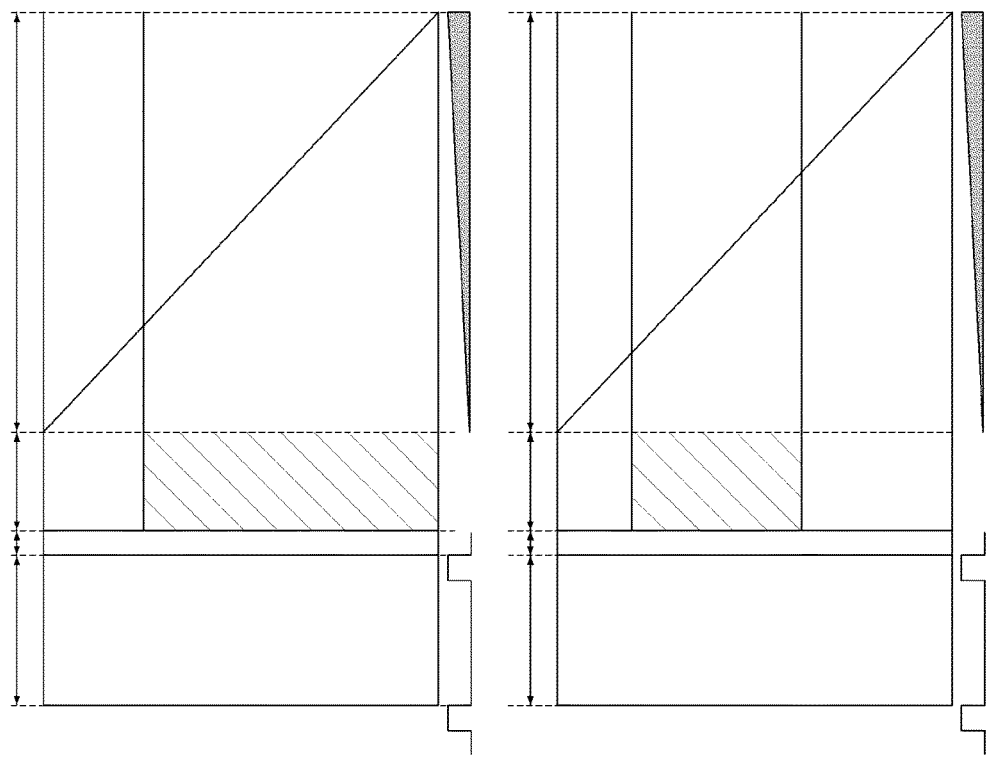
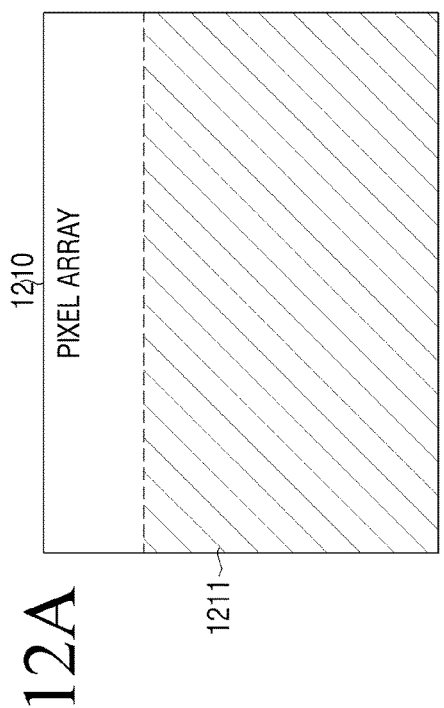
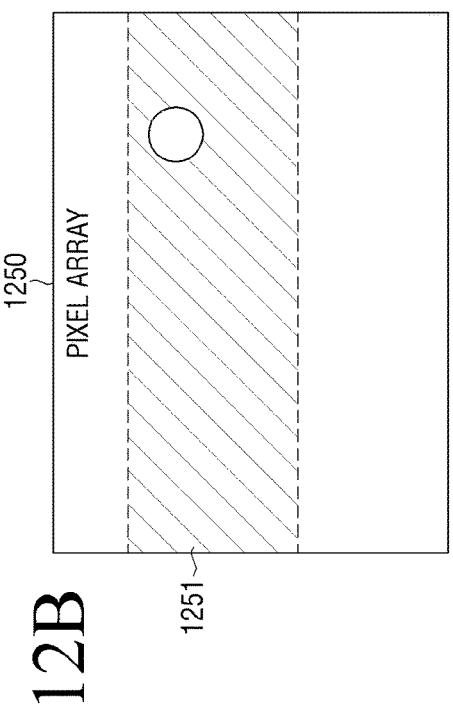
FIG. 12A
FIG. 12B

PHOTOGRAPHING APPARATUS AND METHOD FOR THE LIGHT LEAKAGE CORRECTION

CROSS-REFERENCE TO RELATED APPLICATION

This application claims priority from Korean Patent Application No. 10-2015-0016019, filed on Feb. 2, 2015 in the Korean Intellectual Property Office, the disclosure of which is incorporated herein by reference in its entirety.

BACKGROUND OF THE INVENTION

1. Field

Apparatuses and methods consistent with exemplary embodiments relate to photographing an image with light leakage correction, and more particularly to photographing an image by correcting light leakage occurring in a global shutter.

2. Description of the Related Art

There are generally two types of image sensors that electrically convert light received into a lens of a photographing apparatus: a charge-coupled device (CCD) sensor and a complementary metal oxide semiconductor (CMOS) sensor.

Both types of sensors retain adequate light leakage by operation of a shutter that adjusts amounts of light by initiating and/or ending light exposure. The shutter may be operated under various electronic shutter mechanisms such as, for example, rolling shutter and global shutter.

In the rolling shutter method, an image sensor does not have a storage that stores charges accumulated in a photo diode at each pixel, and thus light exposure is initiated and ended consecutively for each pixel. In other words, the photodiodes at each pixel do not collect light at the same time. All the pixels in one row of the image sensor collect light during the same period of time, but the time that light collection starts and ends is slightly different for each row.

In the global shutter method, light exposure is initiated in all the pixels of an image sensor simultaneously, and after an adequate light exposure time, using a storage provided per pixel, light exposure ends in all the pixels simultaneously.

However, in a CMOS type global shutter, when a global shutter operates, after photo-generated charges are stored in pixel-level storages until the charges are read out, a light leakage phenomenon may occur and therefore the photo-generated charges in the pixel-level storages may leak into surrounding pixels related to a high luminance subject. For example, in the case of a pixel that is read out the latest, the light leakage phenomenon becomes more severe in proportion to the period of time the readout is performed.

SUMMARY

Exemplary embodiments address at least the above problems and/or disadvantages and other disadvantages not described above. Also, the exemplary embodiment are not required to overcome the disadvantages described above, and may not overcome any of the problems described above.

One or more exemplary embodiments provide a global shutter type photographing apparatus and method capable of correcting deterioration of image quality caused by the light leakage phenomenon that occurs when charges stored in a storage of each pixel are being read out in an image sensor.

According to an aspect of an exemplary embodiment, there is provided a photographing apparatus including: an image sensor that comprises a plurality of pixels and is configured to perform a first readout on charges stored in a group of pixels among the plurality of pixels at a first readout time and perform a second readout on charges stored in the plurality of pixels, including the group of pixels, at a second readout time; and an image processor configured to detect a pixel in which a light leakage has occurred of among the plurality of pixels based on at least one of a value the first readout charges and a value of the second read out charges, and perform a correction on the detected pixel to generate an image.

The image processor may compare the second readout value of the group of pixels with a threshold value, and determine at least one of the group of pixels as a light leakage pixel in which a light leakage has occurred in response to the second readout value of the at least one of the group of pixels exceeding the threshold value.

The image processor may determine a difference value between a second readout value of charges of a periphery pixel on the periphery of the light leakage pixel and a first readout value of charges of the light leakage pixel, and determine the periphery pixel as a periphery light leakage pixel in which a light leakage has occurred based on the difference value and the second readout value of the light leakage pixel.

The image processor may determine a correction value to correct the second readout value of the periphery light leakage pixel by deducting the difference value from the second readout value of the periphery light leakage pixel or by deducting the second readout value of the light leakage pixel from the second readout value of the periphery light leakage pixel.

The image processor may generate an image based on the first readout value of the group of pixels, the correction value of the periphery light leakage pixel, and the second readout value of the plurality of pixels other than the periphery light leakage pixel.

The image processor may determine the first read out value of the light leakage pixel as the correction value of the periphery light leakage pixel in response to the second readout value of the periphery light leakage pixel being equal to or greater than a threshold value.

In response to the first readout value of the group of pixels being less than the threshold value, the image processor may generate an image based on the first readout value of the group of pixels and the second readout value of charges of the plurality of pixels other than the group of pixels.

The photographing apparatus may further include an illuminance sensor configured to measure an illuminance value of a photographed subject. The image processor may analyze the illuminance value to determine the group of pixels as pixels on which the first readout is to be performed.

The image processor may determine whether a light source area exists in an image of the photographed subject based on the illuminance value, determine the group of pixels in a crop method in response to the light source area existing, and determine the group of pixels in a skip method in response to the light source area not existing.

The image processor may analyze the illuminance value to determine a multiple readout on the group of pixels to perform the first read out in the skip method.

According to an aspect of another exemplary embodiment, there is provided a method for light leakage correction of a photographing apparatus including: performing a first readout on charges stored in a group of pixels among a plurality of pixels at a first readout time; performing a second readout on charges stored in the plurality of pixels, including the group of pixels, at a second readout time; detecting a pixel in which a light leakage has occurred of among the plurality of pixels based on at least one of a value of the first readout charges and a value of the second readout charges; performing a correction on the detected pixel to correct a value of charges stored in the detected pixel; and generating an image based on the corrected value of the detected pixel and values of charges stored in the plurality of pixels other than the detected pixel.

The detecting may include comparing the second readout value of the group of pixels with a threshold value, and determining at least one of the group of pixels as a light leakage pixel in response to the second readout value of the at least one of the group of pixels exceeding the threshold value.

The detecting may include determining a difference value between a second readout value of charges of a periphery pixel on the periphery of the light leakage pixel and a first readout value of charges of the light leakage pixel, and determining the periphery pixel as a periphery light leakage pixel in which a light leakage has occurred based on the difference value and the second readout value of the light leakage pixel.

The performing the correction may include determining a correction value to correct the second readout value of the periphery light leakage pixel by deducting the difference value from the second readout value of the periphery light leakage pixel or by deducting the second read out value of the light leakage pixel from the second read out value of the periphery light leakage pixel.

The generating the image may include generating the image based on the first readout value of the group of pixels, the correction value of the periphery light leakage pixel, and the second readout value of the plurality of pixels other than the periphery light leakage pixel.

The performing the correction may include, in response to the second readout value of the periphery light leakage pixel being equal to or greater than a threshold value, determining the correction value o of the periphery light leakage pixel based on the first readout value of the light leakage pixel.

The generating the image may include, in response to the first readout value of each of the group of pixels being less than the threshold value, generating the image based on the first readout value of the group of pixels and the second readout value of the plurality of pixels other than the group of pixels.

The method may further include analyzing an illuminance value measured by an illuminance sensor and determining the group of pixels as pixels on which the first readout is to be performed.

The determining may include determining the group of pixels in a crop method in response to a light source area being determined as existing in an image of a photographed subject based on the illuminance value, and determining the group of pixels in a skip method in response to the light source area being determined as not existing.

The determining may include analyzing the illuminance value and determining a multiple read out on the group of pixels to perform the first readout in the skip method.

According to an aspect of another exemplary embodiment, there is provided a method of generating an image by a photographing apparatus including: determining an area of the image that has an illuminance value greater than a illuminance threshold value as a crop area; performing a first readout on a first group of pixels included in the crop area at a first readout time; performing a second readout on the first group of pixels and a second group of pixels included in the crop area at a second readout time, the first group of pixels and the second group of pixels being alternately arranged; detecting a light leakage pixel among the first group of pixels based on a comparison between a second readout value of the first group of pixels and a leakage threshold value; and performing a correction on the light leakage pixel to correct the second readout value.

The performing the first readout may be performed by a skip method in which the first group of pixels are read out and the second group of pixels are skipped.

The method may further include determining at least one of the second group of pixels as a light leakage pixel based on a difference between a second readout of the second group of pixels and a first readout value of the first group of pixels.

According to the exemplary embodiments, a photographing apparatus may quickly detect an area where a light leakage phenomenon has occurred while performing a read out on the charges stored in a plurality of pixels in an image sensor. Furthermore, the photographing apparatus according to the exemplary embodiments may perform correcting of the light leakage phenomenon detected, thereby improving deterioration of image quality.

BRIEF DESCRIPTION OF THE DRAWING FIGURES

The above and/or other aspects will be more apparent by describing certain exemplary embodiments, with reference to the accompanying drawings, in which.

Figure 9A:
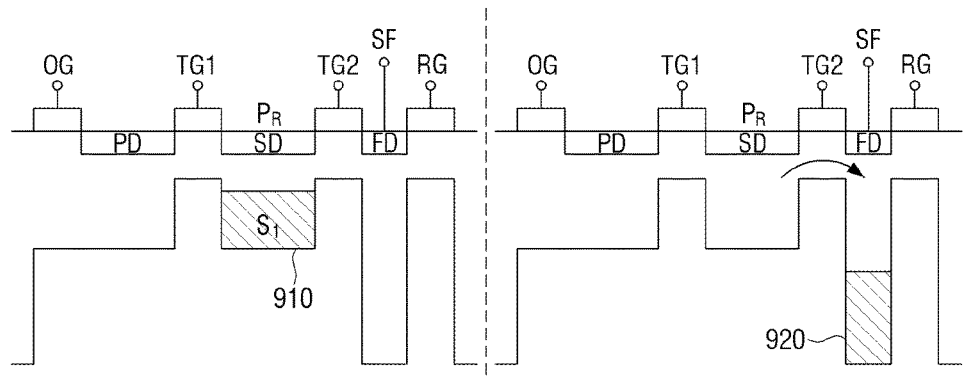
Figure 9B:
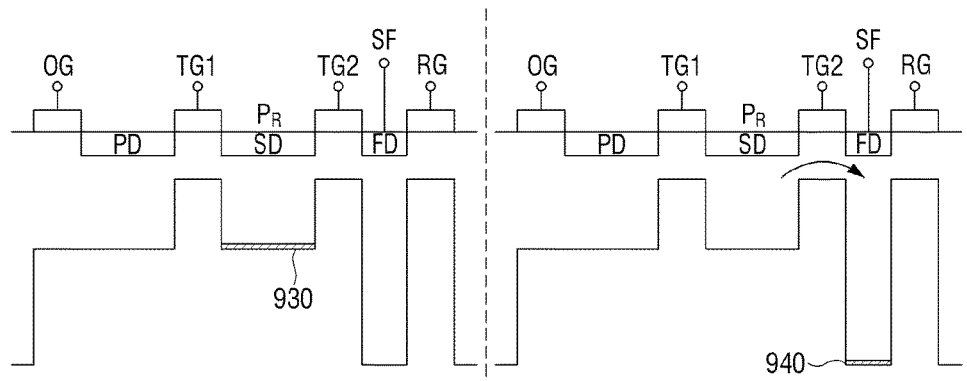
Figure 9C:
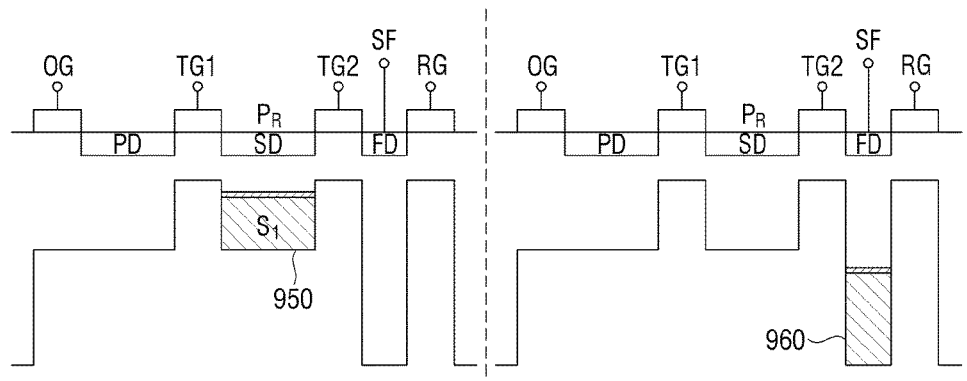
Figure 10A:
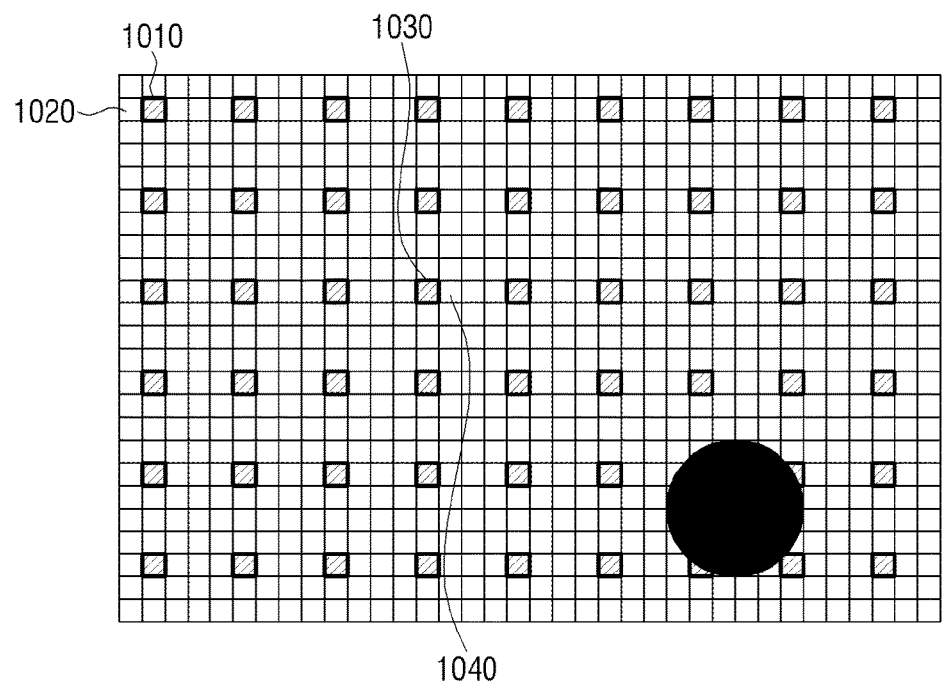
Figure 10B:
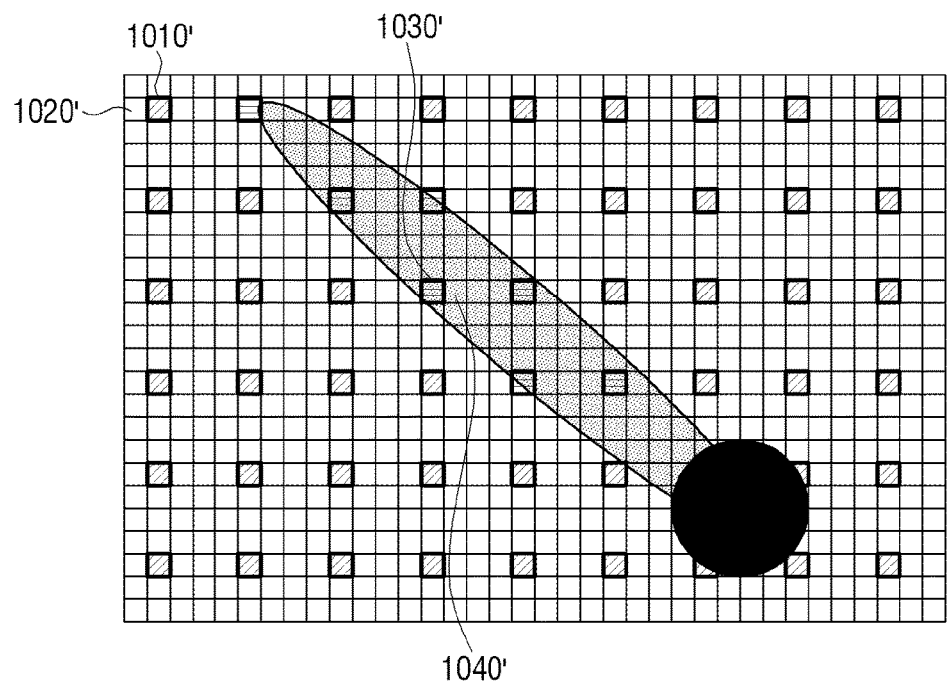
Figure 11A:
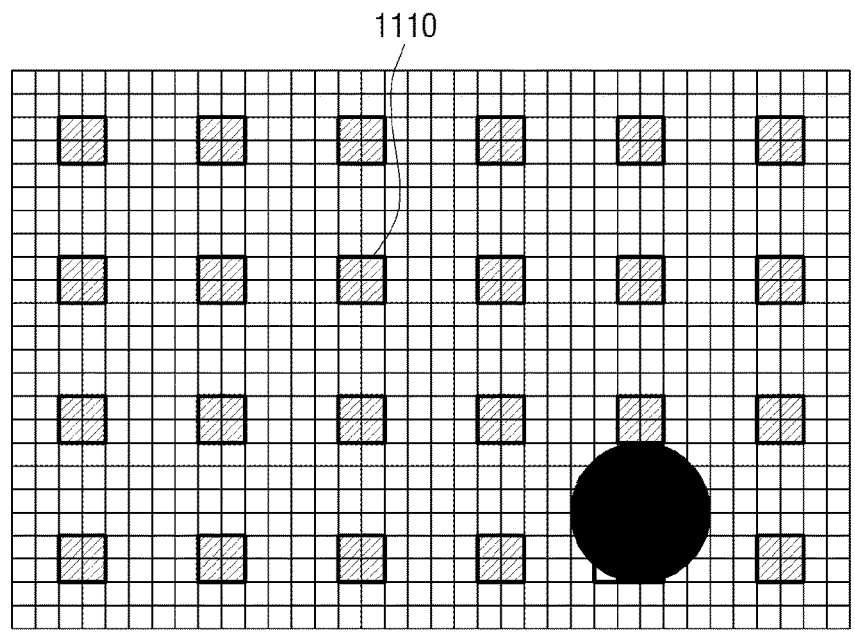
Figure 11B:
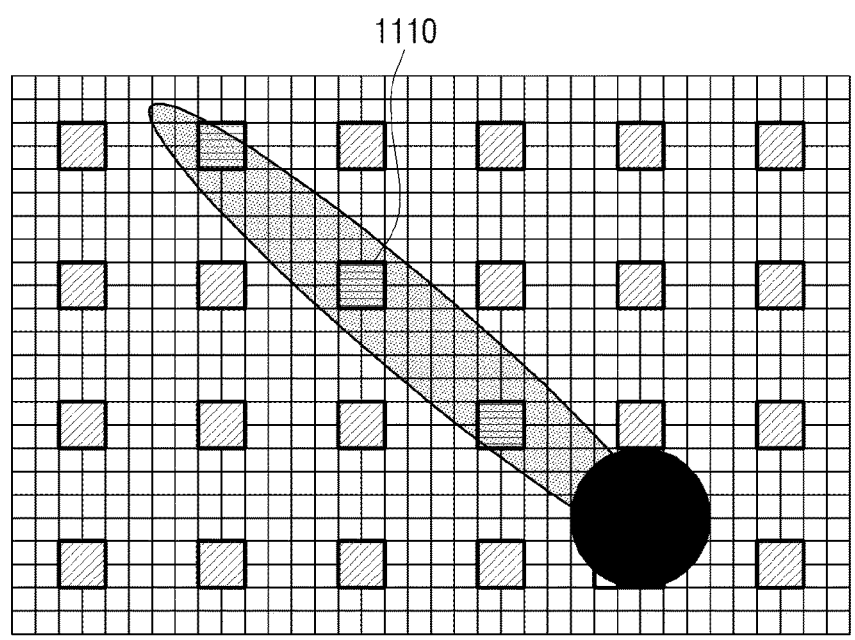
Figure 13A:
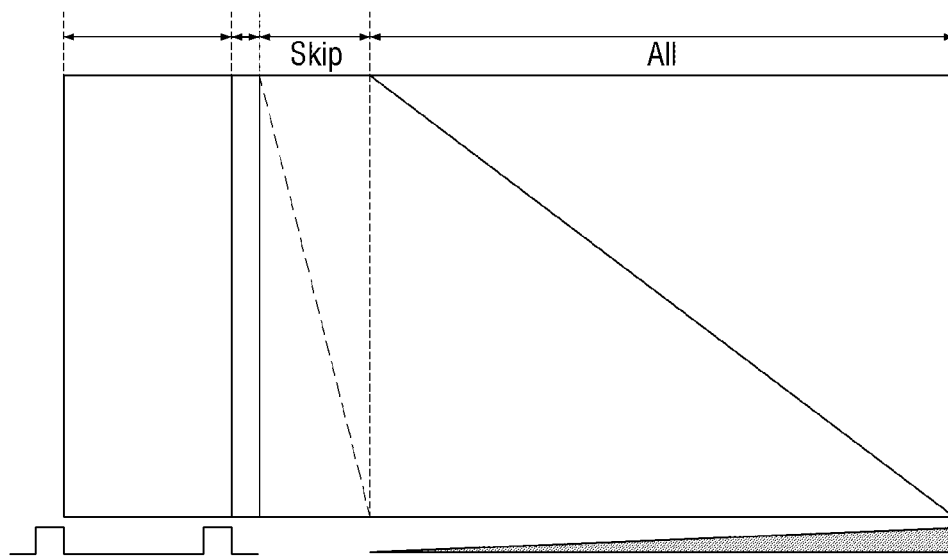
Figure 13B:
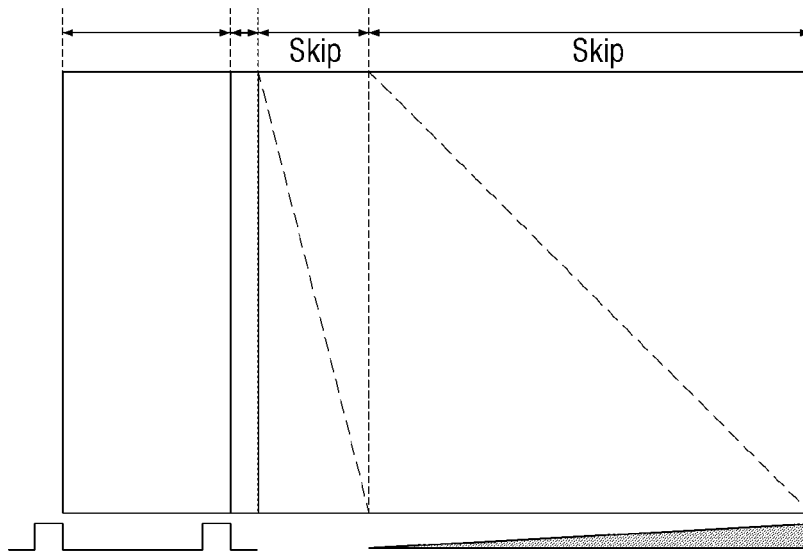
Figure 14:
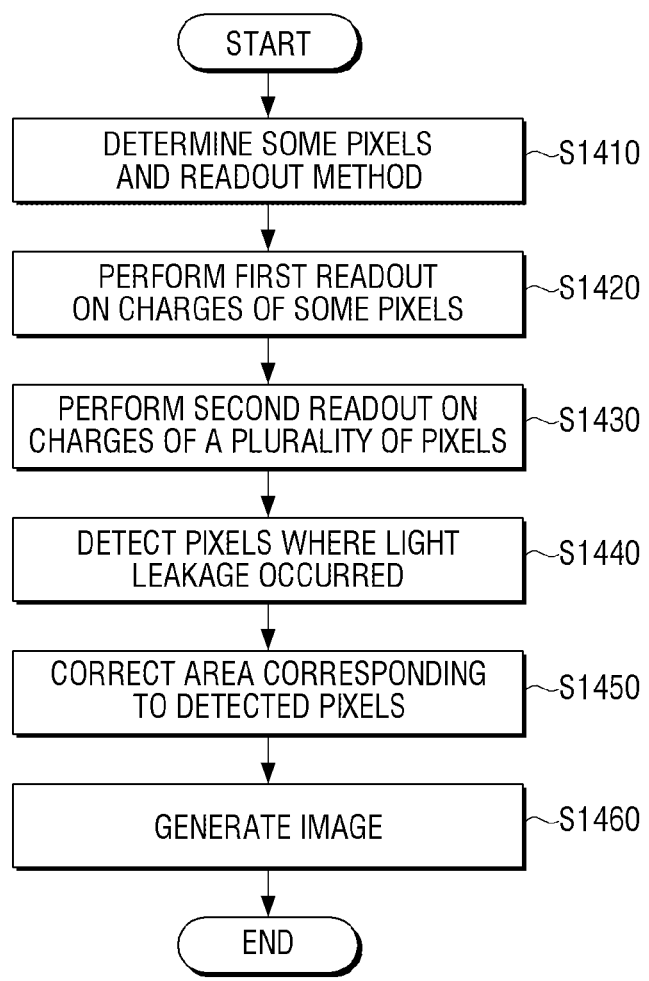

FIGS. 9A, 9B, and 9C are exemplary views illustrating movements of charges when the charges are read out in an image sensor of a photographing apparatus according to an exemplary embodiment;

FIGS. 10A and 10B are first exemplary views illustrating an area where the light leakage phenomenon occurred based on a skip method in an image sensor of a photographing apparatus according to an exemplary embodiment;

FIGS. 11A and 11B are second exemplary views illustrating an area where the light leakage phenomenon occurred based on a skip method in an image sensor of a photographing apparatus according to an exemplary embodiment;

FIGS. 12A and 12B are exemplary views of determining an area to be corrected due to the light leakage phenomenon in an image sensor of a photographing apparatus according to an exemplary embodiment;

FIGS. 13A and 13B are exemplary views of performing a readout in a case where there is no light leakage area in an image sensor of a photographing apparatus according to an exemplary embodiment; and FIG. 14 is a flowchart of a method for performing a light leakage correction in a photographing apparatus according to an exemplary embodiment.

DETAILED DESCRIPTION

Exemplary embodiments are described in greater detail below with reference to the accompanying drawings.

In the following description, like drawing reference numerals are used for the same elements even in different drawings. The matters defined in the description, such as detailed construction and elements, are provided to assist in a comprehensive understanding of the invention. However, it is apparent that the exemplary embodiments can be carried out without those specifically defined matters. Also, well-known functions or constructions are not described in detail since they would obscure the invention with unnecessary detail.

The terms "first", "second", etc. may be used to describe diverse components, but the components are not limited by the terms. The terms are only used to distinguish one component from the others.

The terms used in describing exemplary embodiments are only used to describe the exemplary embodiments, but are not intended to limit the scope of the disclosure. The singular expression also includes the plural meaning as long as it does not differently mean in the context. The terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

Figure 1:
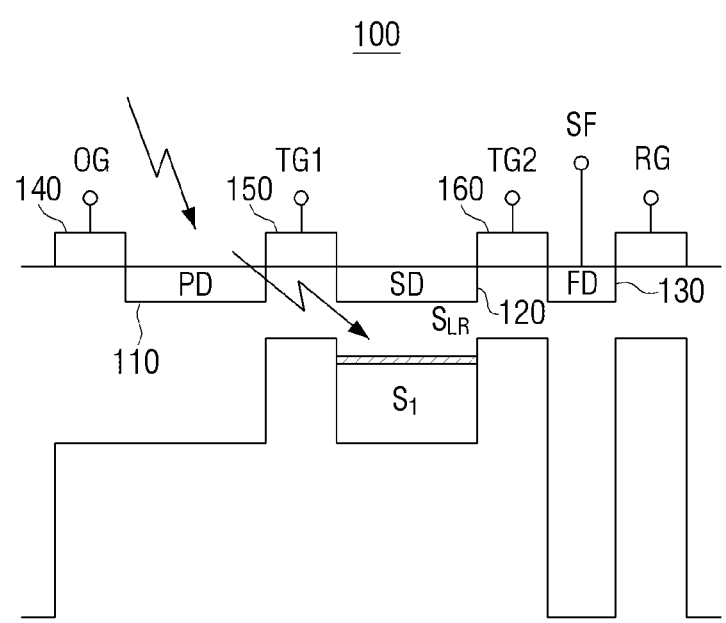
FIG. 1 is an exemplary view illustrating an image sensor of a general global shutter.

FIG. 1 is an exemplary view of an image sensor using a global shutter mechanism.

As illustrated in FIG. 1, in general, an image sensor 100 of a global shutter includes a plurality of pixels, and each of the plurality of pixels includes a photo diode PD 110, a storage diode SD 120, and a floating diffusion node FD 130.

When light exposure to a photo diode 110 of each pixel is initiated by a reset operation of an over flow gate 140, the photo diode 110 of each pixel converts photons of the received light into electrical charges and accumulates the charges. According to the exemplary embodiment, the image sensor 100 may have a memory-in-pixel structure, in which each pixel includes the pixel-level storage (i.e., storage diode) 120 to temporarily store the photo-generated charges in addition to the photo diode 110 and the readout circuitry such as a second timing gate 160 and the floating diffusion node 130.

Every row of the image sensor 100 may start an exposure at the same time. At the end of the exposure, a switch of a first timing gate 150 is turned on to be in a conduction state. Upon the switch being turned on, the charges accumulated in the photo diode 110 of each pixel in the row may be globally transferred to the storage diode 120 of each pixel so that the transferred charge are read out row-by-row via readout scanning. When a switch of the second timing gate 160 is turned on according to a read out timing, the floating diffusion node 130 of each pixel reads out the charges stored in a storage diode 120 of each pixel consecutively. The storage diode 120 may allow the charge accumulation and readout operation to be performed at each individual pixel, thus eliminating the need for rolling shutter pulses.

Figure 2:
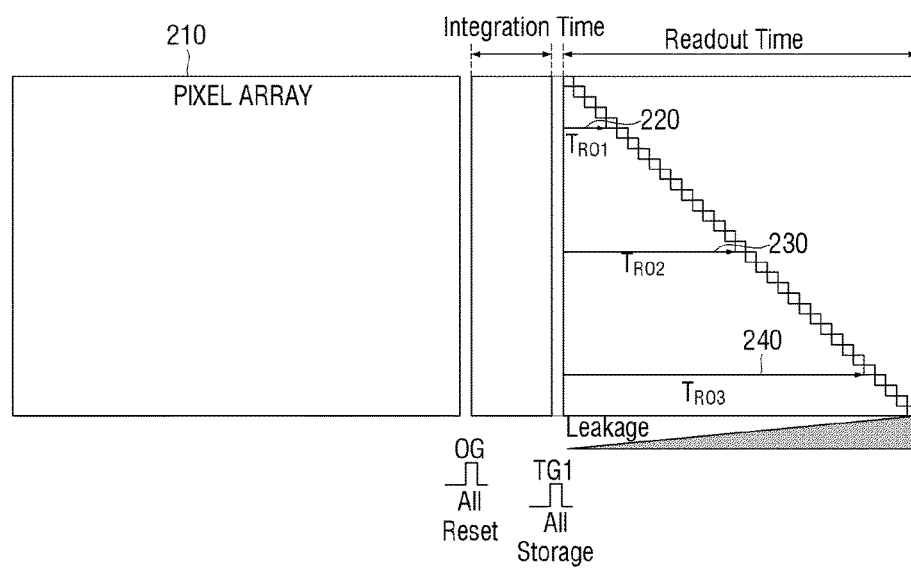
FIG. 2 is an exemplary view illustrating an operation of reading out charges in an image sensor of a global shutter.

FIG. 2 is an exemplary view of charges in an image sensor of a global shutter being read out.

As illustrated in FIG. 2, a floating diffusion node 130 of each pixel consecutively reads out charges stored in a storage diode 120 in a pixel array 210 row-by-row.

First, a floating diffusion node 130 in the first row of the pixel array 210 reads out charges stored in a corresponding storage diode 120. When the charges stored in the storage diode 120 in the first row are all read out, a floating diffusion node 130 in the second row reads out charges stored in a storage diode 120 of a pixel in the second row.

As the charges stored in a storage diode 120 are read out in such an order, a floating diffusion node 130 of each pixel in the n-th row may read out the charges stored in a corresponding storage diode 120 in the n-th row after the charges stored in a storage diode 120 in the (n−1)th row are all read out. The "n" denotes a positive integer.

Meanwhile, not only charges (SI) accumulated in a photo diode 110, but also leakage charges (SLR) generated by light leakage due to diffraction and diffused reflection may flow into a storage diode 120 of each pixel.

As illustrated in FIG. 2, a floating diffusion node 130 in the fifth row of the pixel array 210 may perform a read out operation after a first time period $T_{RO1}$ 200 that elapses from the point when a read out is performed on a floating diffusion node 130 in the first row. Accordingly, in a storage diode 120 of the fifth row, while charges are transmitted from a photo diode 110, leakage charges are stored during the time period $T_{RO1}$ 200. Thus, the floating diffusion node 130 reads out a value of charges that include the charges that flow into the storage diode 120 during the first time period $T_{RO1}$ 200.

Furthermore, a floating diffusion node 130 in the sixteenth row may perform a read out operation after a second time period $T_{RO2}$ 230 that elapses from the point when the read out is performed on the floating diffusion node 130 of the first row. Accordingly, in the storage diode 120 of the sixteenth row, while charges are transmitted from the photo diode 110, leakage charges are stored for the T2 (230) period of time. Thus, the floating diffusion node 130 may read out a value of charges that include the leakage charges that flow into the storage diode 120 during the second time period $T_{RO2}$ 230.

Furthermore, a floating diffusion node 130 in the twenty eighth row may perform a read out operation after a third time period $T_{RO3}$ 240 that elapses from the point when the read out is performed in the floating diffusion node 130 of the first row. Accordingly, in a storage diode 120 of the eighteenth line, while charges are transmitted from the photo diode 110, leakage charges are stored during the third time period $T_{RO3}$ 240. Thus, the floating diffusion node 130 may read out a value of charges that include the leakage charges that flow into the storage diode 120 during the third time period $T_{RO3}$ 240.

As such, the leakage charges flowing into a storage diode 120 of each pixel increases in proportion to the read out time. Accordingly, in the case of photographing a white image under the same luminance environment, due to a difference of leakage charges that is proportionate to a read out time of the charges stored in a storage diode 120 of each pixel, a gradation phenomenon may occur between an upper portion and lower portion of the image.

Hereinabove, operations for reading out charges stored in a storage diode 120 of each pixel in an image sensor 100 of a global shutter were explained. Hereinafter, components of a photographing apparatus 300 will be explained in detail.

Figure 3:
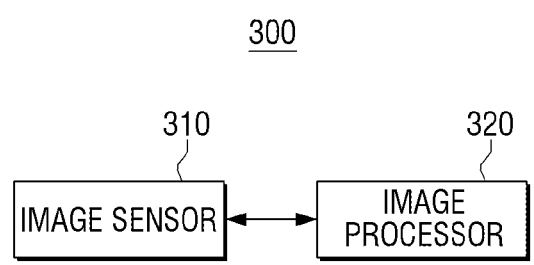
FIG. 3 is a block diagram schematically illustrating a photographing apparatus according to an exemplary embodiment.

FIG. 3 is a block diagram schematically illustrating a photographing apparatus according to an exemplary embodiment.

As illustrated in FIG. 3, a photographing apparatus 300 may include an image sensor 310 and an image processor 320.

The image sensor 310 may include a plurality of pixels, and each of the plurality of pixels may be arranged to configure a pixel array. The image sensor 310 may perform a first read out on charges stored in some of the plurality of pixels, and then performs a second read out on charges stored in each of the plurality of pixels. This image sensor 310 may be a global shutter type image sensor such as, for example, a charge-coupled device (CCD) sensor or a complementary metal oxide semiconductor (CMOS) sensor.

The image processor 320 may detect a pixel in which a light leakage phenomenon occurs, among the plurality of pixels, based on a value of charges of some pixels that are first read out (hereinafter, first-read pixels) and a value of charges of the plurality of pixels that are second read out (hereinafter, second-read pixels). The light leakage phenomenon may refer to a phenomenon that some charge leaks from a photo diode or a storage diode through a transfer gate to floating diffusion during the next exposure time. The image processor 320 may perform a correction on the detected pixel and generate an image that reflects the correction. Specifically, the image sensor 310 may output the value of the charges of the first-read pixels and the value of the charges of the second-read pixels regarding one image. The output values are amplified into analogue signals of a certain size and then converted into digital signals through an analog-to-digital converter (ADC).

Therefore, the image processor 320 may receive the digital signals regarding the charges output from the image sensor 310 regarding the one image and detect the light leakage area, and perform image processing such as correcting and/or synthesizing of the detected light leakage area, and generate an entirety of image signals regarding the photographed image.

Figure 4:
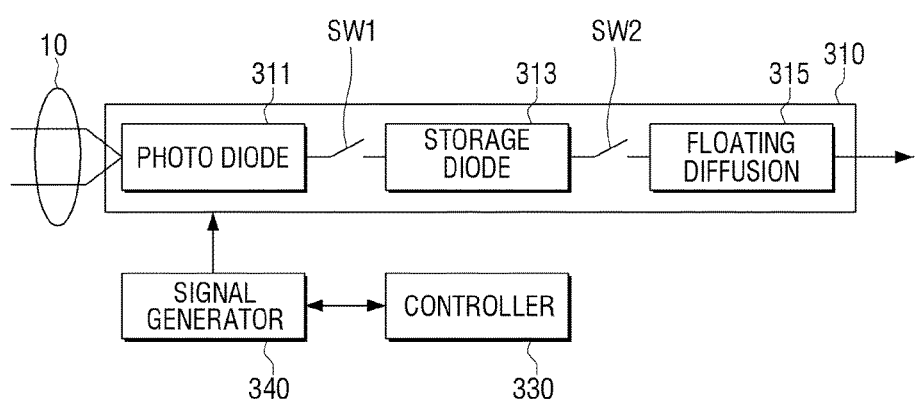
FIG. 4 is a block diagram of an image sensor according to an exemplary embodiment.

The image sensor 310 that performs a first read out on the charges stored in some of the plurality of pixels, and then performs a second read out on the charges stored in the plurality of pixels may be configured as shown in FIG. 4.

FIG. 4 is a block diagram of an image sensor according to an exemplary embodiment.

As illustrated in FIG. 4, the image sensor 310 may be a global shutter type image sensor such as a charge-coupled device (CCD) sensor or a complement metal oxide semiconductor (CMOS) sensor. The image sensor 310 may include a plurality of pixels, and each of the plurality of pixels may include a photo diode 311, a storage diode 313 and a floating diffusion node 315. Furthermore, each of the plurality of pixels that form the image sensor 310 may include a plurality of switches SW1 and SW2 that switch on and off transmission of charges from the photo diode 311 to the storage diode 313 and the floating diffusion node 315.

Each photo diode 311 of the plurality of pixels may be exposed to light through a lens 10. The photo diode 311 may receive photons of the light, accumulate charges generated from the photons, and convert the accumulated charges into electrical signals. Furthermore, each storage diode 313 of the plurality of pixels may store charges transferred from each photo diode 311.

Specifically, in response to a control command to photograph an image being input with charges accumulated in each photo diode 311, the controller 330 may control the signal generator 340 to generate a storage signal. According to the control command, the signal generator 340 may generate a storage signal, and provide the signal to the image sensor 310. Accordingly, each photo diode 311 may transmit the charges accumulated in each photo diode 311 to the storage diode 313, thereby the charges accumulated in the photo diode 311 of each pixel become stored in the storage diode 313 of each pixel.

As such, when the charges are stored in the storage diode 313 of each pixel, the floating diffusion node 315 of each pixel reads out the charges stored in each storage diode 313. Specifically, floating diffusion node 315 of some of the plurality of pixels perform a first read out on the charges stored in the storage diodes 313 of the pixels. In response to the first read out being completed, the floating diffusion node 315 of each of the plurality of pixels performs a second read out on the charges stored in each storage diode 313.

Therefore, the image processor 320 may detect a pixel in which the light leakage phenomenon occurs, among the plurality of pixels, based on the value of the charges regarding the first-read pixels and the value of the charges regarding the second-read pixels, and perform a correction on the detected pixel and generate an image that reflects the correction.

Figure 5:
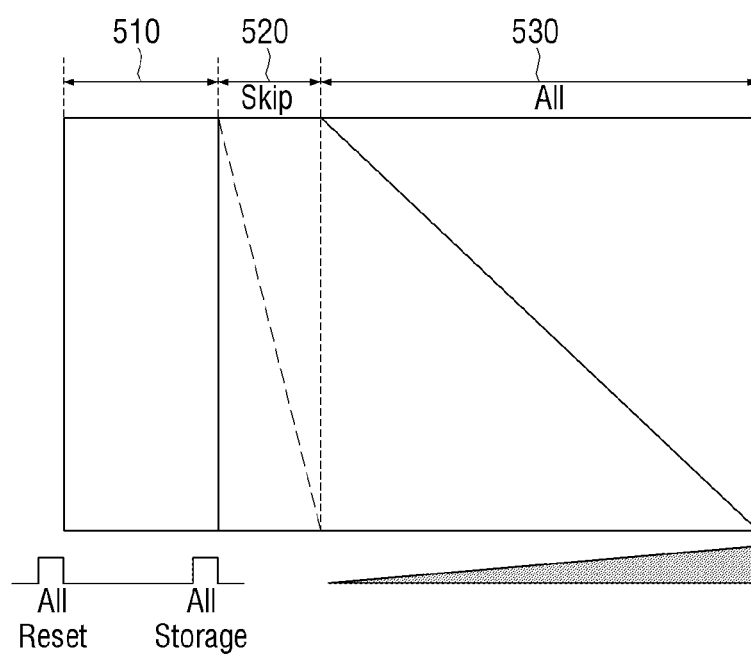
FIG. 5 is an exemplary view of changes stored in a plurality of pixels in an image sensor being read out according to an exemplary embodiment.

FIG. 5 is an exemplary view of charges stored in a plurality of pixels being read out in an image sensor according to an exemplary embodiment.

As illustrated in FIG. 5, a first section 510 is a section for storing, in a storage diode 313, the charges accumulated in each photo diode 311 of each of the plurality of pixels according to a reset signal and a transmission signal applied.

Furthermore, a second section 520 is a section for consecutively performing a first read out on the charges stored in the storage diodes 313 of some of the plurality of pixels in the image sensor 310. In this second section 520, the image sensor 310 consecutively performs a first read out line-by-line (e.g., row-by-row) on the charges stored in the storage diodes 313 of some of the plurality of pixels according to a predetermined read out method. Herein, the predetermined read out method may be a skip method or crop method. Therefore, the image sensor 310 may consecutively perform a first read out operation per line on the charges stored in the storage diodes 313 of some of the plurality of pixels through one of the skip or crop method. Hereinafter, the skip method or crop method for performing such a first read out operation will be explained in detail.

Furthermore, a third section 530 is a section for consecutively performing a second read out on the charges stored in the storage diodes 313 of the plurality of pixels. In the third section 530, the image sensor 310 consecutively performs a second read out on the charges stored in the storage diode 313 of each of the plurality of pixels per line.

Therefore, the image processor 320 may detect a pixel in which light leakage phenomenon has occurred, among the plurality of pixels, based on a value of charges of some pixels that are first read out by the image sensor 310 in the second section 520, and a value of charges of the plurality of pixels that are second read out by the image sensor 310 in the third section 530, and perform a correction on an area that corresponds to the detected pixel, and generate an image.

Figure 6:
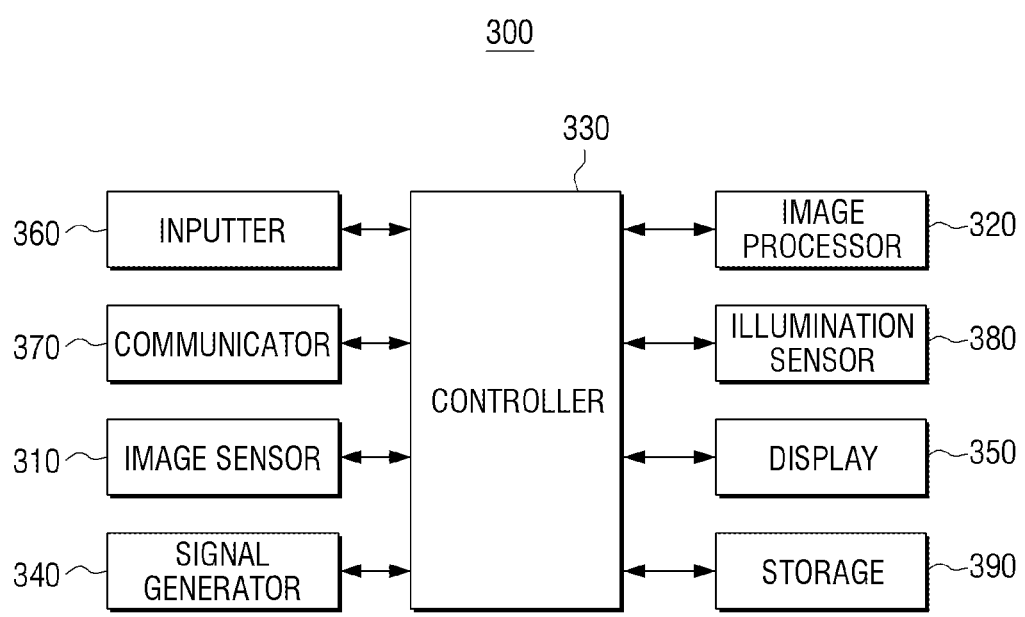
FIG. 6 is a detailed block diagram of a photographing apparatus according to an exemplary embodiment.

FIG. 6 is a detailed block diagram of a photographing apparatus according to an exemplary embodiment.

As illustrated in FIG. 6, the photographing apparatus 300 may further include a controller 330, a signal generator 340, a display 350, an inputter 360, a communicator 370, an illuminance sensor 380, and a storage 390, in addition to the aforementioned image sensor 310 and image processor 320.

The controller 330 controls overall operations of the components of the photographing apparatus 300. For example, the controller 330 controls the signal generator 340 to provide a reset signal and a transmission signal to the image sensor 310. Upon a control command being transmitted from the controller, the signal generator 340 generates a reset signal and a transmission signal and provides the generated reset signal and transmission signal to the image sensor 310. Therefore, according to the reset signal and transmission signal provided from the signal generator 340, the image sensor may provide the charges accumulated in the photo diode 313 of each pixel to the storage diode 315 or read out the charges stored in the storage diode 315 through the floating diffusion node 315.

At the control command of the controller 330, the display 350 may display on the screen at least one of the image processed and generated in the image processor 320 and on-screen display (OSD) information. Herein, the image may be at least one of a photographed image and live image. The display 350 may be integrated with a touch panel that receives a user's touch command.

The inputter 360 may receive a user's command, and the inputter 360 may include at least one button. The inputter 360 may include the touch panel positioned on the display 350. Therefore, the inputter 360 may receive a user's command to photograph an image or to edit the photographed image through at least one of the button and the touch panel.

The communicator 370 may perform a wireless or wired data communication with an external terminal apparatus. In a case of performing a wireless data communication with an external terminal apparatus, the communicator 370 may include at least one of a WiFi direct communication module, a near field communication (NFC) module, Zigbee module, cellular communication module, a third generation (3G) mobile communication module, a fourth generation (4G) mobile communication module, and a 4G long term evolution (LTE) communication module.

In a case of performing a wired communication with an external terminal apparatus, the communicator 370 may include an interface module such as a universal serial bus (USB), and the communicator 370 may be physically connected to an external terminal apparatus such as a personal computer (PC) through such an interface module, and may transceive image data or transceive firmware data for performing a firmware upgrading.

The illuminance sensor 380 may measure an illuminance of a subject to be photographed and output the measured illuminance value to the image processor 320. Accordingly, the image processor 320 may determine a brightness value corresponding to the brightness of the subject to be photographed based on the illuminance value measured in the illuminance sensor 380. Then, the image processor 320 may analyze the brightness value and determine which pixels to be first read out of among the plurality of pixels.

The storage 390 may store information on the photographed image and information necessary for controlling of the photographing apparatus 300. The storage 390 may temporarily store a value of charges of some of the plurality of pixels that are first read out and a value of charges of the plurality of pixels that are second read out that form the image sensor 310. The storage 390 may be realized as a storage medium such as a volatile memory (e.g., flash memory, electrically erasable read-only memory (EEROM), and hard disc and the like). The aforementioned image processor 320 may compare a value of charges (PL) of some pixels that were second read out with a predetermined threshold value (hereinafter referred to as a first threshold value), and detect at least one pixel that exceeds the first threshold value as a pixel in which the light leakage phenomenon has occurred. Specifically, in response to a second read out value of charges (PL) of at least one pixel (hereinafter referred to as a first pixel) of among some of the first read out pixels exceeding the first threshold value, the first pixel may be detected as the pixel in which the light leakage phenomenon has occurred. For example, the first pixel may be included in a high brightness photograph subject area in which the light leakage phenomenon is highly likely to occur. In this case, in the storage diode 313 of the first pixel from which charges have been first read out and cleared, leakage charges may flow in. Therefore, when a second read out is performed on the first pixel that has been first read out through the image sensor 310, the image processor 320 may receive input of a value of charges (PL) regarding the leakage charges that flow into the storage diode 313 of the first pixel.

When the second read out value of charges (PL) regarding the first pixel is input, the image processor 320 may compare the second read out light leakage value of charges (PL) of the first pixel with the first threshold value, and in response to the second read out light leakage value of charges (PL) of the first pixel exceeding the first threshold value, the image processor 320 may detect the first pixel as a light leakage pixel where the light leakage pixel phenomenon has occurred.

As such, when the first pixel is detected as a light leakage pixel, the image processor 320 may determine a difference value of the second read out value of charges (PI) of the pixel (hereinafter referred to as a second pixel) on the periphery of the first pixel and the first read out value of charges (PR) of the first pixel. The second pixel may be adjacent to the first pixel, and may be referred to as a periphery pixel or an adjacent pixel. Then, the image processor 320 may compare the difference value and the second read out value of charges (PL) of the first pixel, and detect the second pixel as a periphery light leakage pixel. In an exemplary embodiment, when the difference value is determined from the second read out value of charges (PI) of the second pixel on the periphery of the first pixel detected as a light leakage pixel and the first read out value of charges (PR) of the first pixel, the image processor 320 determines whether or not a difference between the difference value and the second read out value of charges (PL) of the first pixel is less than a predetermined threshold value (hereinafter referred to as a second threshold value). If it is determined that the difference between the difference value and the second read out value of charges of the first pixel is less than the second threshold value, the image processor 320 may detect the second pixel on the periphery of the first pixel as a periphery light leakage pixel.

For example, the second pixel on the periphery of the first pixel may be included in a high brightness photograph subject area where a light leakage phenomenon is highly possible. In such a case, leakage charges as well as charges stored in the photo diode 311 may flow into the storage diode 313 of the second pixel during the second read out. Therefore, when the second read out is performed on the second pixel through the image sensor 310, the image processor 320 may receive input of a value of charges (PI) that includes a value of charges (PR) stored in the storage diode 313 of the second pixel and a value of charges (PL) regarding the leakage charges that flow into the storage diode 313 of the second pixel.

When the second read out value of charges (PI) of the second pixel is input, the image processor 320 may determine the difference value of the second read out value of charges (PI) of the second pixel and the first read out value of charges (PR) of the first pixel, and if the difference between the determined difference value and the second read out light leakage value of charges (PL) of the first pixel is less than the second threshold value, the image processor 320 may detect the second pixel as a periphery light leakage pixel where the light leakage phenomenon has occurred. When the second pixel is detected as the periphery light leakage pixel, the image processor 320 may determine a correction value of charges to correct the second pixel detected.

In an exemplary embodiment, the image processor 320 may determine the correction value by deducting a predetermined difference value from a pixel value (PI) of the second pixel detected as the periphery light leakage pixel. Herein, as aforementioned, the predetermined difference value may be a result value of deducting the first read out value of charges (PR) of the first pixel from the second read out value of charges (PI) of the second pixel on the periphery of the first pixel detected as a light leakage pixel.

In another exemplary embodiment, the image processor 320 may determine the correction value by deducting the second read out light leakage value of charges (PL) of the first pixel from the pixel value (PI) of the second pixel. The second pixel is on the periphery of the first pixel and is detected as a periphery light leakage pixel.

According to another exemplary embodiment, when the second read out value of charges (PI) of the second pixel is equal to or greater the predetermined threshold value (hereinafter referred to as a third threshold value), the image processor 320 may determine a correction value of charges of the second pixel using the first read out value of charges (PR) of the first pixel on the periphery of the second pixel. For example, a greater amount of leakage charges may flow into the area corresponding to the second pixel of among the pixels detected as areas where light leakage phenomenon has occurred. In this case, the image processor 320 may compare the second read out value of charges (PI) of the second pixel and the third threshold value, and in response to the second read out value of charges (PI) of the second pixel exceeding the third threshold value, the image processor 320 may determine the first read out value of charges (PR) of the first pixel on the periphery of the second pixel as the correction value of charges of the second pixel.

As such, when the correction value of charges of the periphery light leakage value is determined, the image processor 320 may generate an image using the first read out value of charges of some of the plurality of pixels, correction value of charges of the periphery light leakage pixel and the second read out value of charges (PI) of the remaining pixels other than the periphery light leakage pixel. Herein, the second readout out value of charges (PI) of the remaining pixels may be the value of charges not flowing into each storage diode 313 of each of the remaining pixels but moved from the photo diode 311 and stored. That is, the second read out value of charges (PI) of each of the remaining pixels may be a value of charges (PR).

In response to the first read out value of charges (PR) of some of the pixels is less than a predetermined threshold value (hereinafter referred to as a fourth threshold value), the image processor 320 may generate an image using the first read out value of charges (PR) of each of some of the pixels and the second read out value of charges (PI) of each of the remaining pixels other than the some of the pixels. Herein, the second read out value of charges (PI) of the remaining pixels other than the some of the pixels may be the value of charges moved from the photo diode 311 to the storage diode 313 of each of the remaining pixels and stored. That is, the second read out value of charges of the remaining pixels other than the some of the pixels may be the value of charges (PR).

Specifically, in response to the first read out value of charges (PR) of the some of the pixels being less than the fourth threshold value, the image processor 320 determines that leakage charges are not stored in the storage diode 313 of each of the plurality of pixels. Accordingly, without performing a detecting process as to whether or not a light leakage phenomenon has occurred in the pixels on the periphery of each of the aforementioned some pixels, the image processor 320 may generate an image using the first read out value of charges (PR) of the some of the pixels and the second read out value of charges (PI) of the remaining pixels other than the some of the pixels.

According an exemplary embodiment, the image processor 320 may determine the some of the pixels to be first read out of among the plurality of pixels by analyzing at least one of an image of the photographed subject (e.g., a moving picture of the subject) and an illuminance value measured by the illuminance sensor 380. Specifically, the image processor 320 determines whether or not a light source area exists by analyzing at least one of the image of the photographed subject and an illuminance value measured by the illuminance sensor 380. If it is determined that there is a light source in a certain area of the photographed subject, the image sensor 310 determines the some of the pixels to be first read out in the crop method or the crop method and skip method. Herein, the crop method is a method of reading out charges of a pixel that belongs to a certain line of among the pixels arranged on a pixel array.

For example, it may be determined that a light source exists in a first area of the photographed subject. In such a case, the image processor 320 determines to perform a first read out on at least one pixel corresponding to the first area of the photographed subject of among the plurality of pixels in the crop method. That is, the image processor 320 may determine the at least one pixel corresponding to the first area where the light source exists of among the plurality of pixels and the remaining pixels included in the same line as the at least one pixel as some of the pixels to be first read out.

Accordingly, the image sensor 310 may consecutively perform a first read out on the charges that are stored in the at least one pixel corresponding to the first area where the light source exists and in the remaining pixels included in the same line as the at least one pixel, and then perform a second read out on the charges stored in the plurality of pixels.

However, there is no limitation thereto, and thus the image sensor 310 may perform a first read out only on the charges stored in the pixels corresponding to the skip method that will be explained hereinafter of among the at least one pixel corresponding to the first area where the light source exists and the remaining pixels included in the same line as the at least one pixel.

If there is no light source in a certain area of the photographed subject, the image processor 320 determines the some of the pixels to be first read out in the skip method. Herein, the skip method is a method for performing a read out and skip alternately on a plurality of pixels. There are various kinds of read skip methods such as, for example, a read-one-skip-three (1R3S) method in which one pixel from four successive or adjacent pixels are read out and the other three pixels are skipped, and a read-one-skip-five (1R5S) method in which one pixel from six successive or adjacent pixels are read out and the other five pixels are skipped. The read skip methods may further include a read-one-skip-one (1R1S) method, a read-one-skip-two (1R2S) method, a read-one-skip-four (1R4S) method, a read-two-skip-four (1R4S) method, a read-two-skip-two method (2R2S), and a read-two-skip-four (2R4S) method. Specifically, the 1R1S method is a method of performing a first read out on charges of a first pixel of an even number line or an odd number line on a pixel array, and then skipping a read out on one periphery pixel on the periphery of the first pixel.

The 1R3S method is a method of performing a first read out on charges of a first pixel included in a first line on a pixel array, skipping a read out on three periphery pixels on the periphery of the first pixel, and in response to the first read out on the first line being completed, skipping a read out on pixels included in 3 lines following the first line, and then performing a first read out on charges of the first pixel included in another line, and then skipping a read out on 3 periphery pixels on the periphery of the first pixel.

The 2R4S method is a method of performing a first read out on charges of a first pixel included in a first and second line existing consecutively on a pixel array and of a second pixel on the periphery of the first pixel, skipping a read out on four periphery pixels on the periphery of the second pixel, and in response to the first read out on the first and second line being completed, skipping a read out on pixels included in four lines existing consecutively following the second line, and then performing a first read out on charges of a first pixel included in four lines existing consecutively and of a second pixel on the periphery of the first pixel, and then skipping a read out on four periphery pixels on the periphery of the second pixel.

The image processor 320 may analyze at least one of an image of the photographed subject and an illuminance value measured by the illuminance sensor 380 and determine pixels on which a first read out is to be performed by using one of the 1R1S, 1R3S, and 2R4S methods. For example, in response to the brightness of the photographed subject being the same or above a predetermined value as a result of analyzing the illuminance value measured by the illuminance sensor 380, the image processor 320 may determine pixels on which a first read out is to be performed by using the 1R1S method. In response to the brightness of the photographed subject being less than the predetermined value, the image processor 320 may determine pixels on which a first read out is to be performed by using the 2R4S method. However, there is no limitation thereto, and thus the image processor 320 may determine a pixel on which a first read out is to be performed by using any other skip methods other than the aforementioned skip methods according to the brightness of the photographed subject.

If it is impossible to analyze the image or illuminance value measured by the illuminance sensor 380, the image processor 320 may determine a pixel on which a first read out is to be performed by using one predetermined skip method of among a plurality of skip methods.

Figure 7A:
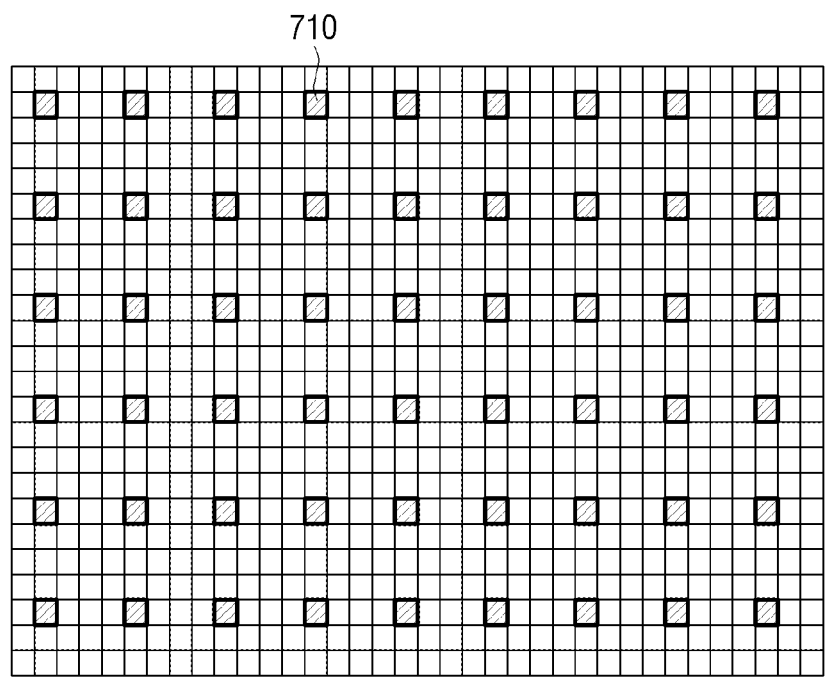
FIGS. 7A and 7B are exemplary views of charges stored in an image sensor being read out in a skip method in a photographing apparatus according to an exemplary embodiment.
Figure 7B:
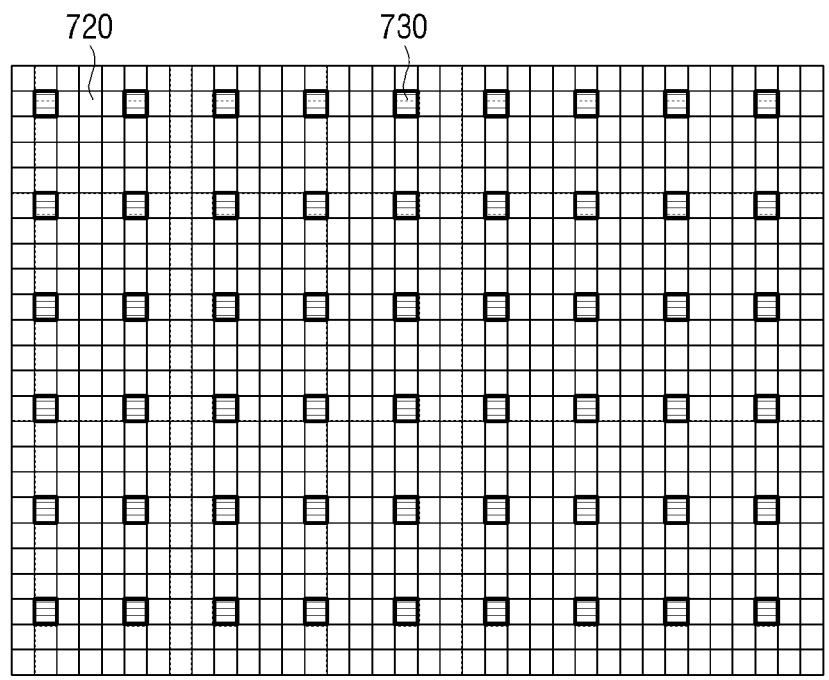

FIGS. 7A and 7B are exemplary views of charges stored in an image sensor of a photographing apparatus being read out in a skip method according to an exemplary embodiment.

As illustrated in FIG. 7A, the image sensor 310 may perform a first read out on charges stored in some of the plurality of pixels in a predetermined skip method and output the same to the image processor 320. For example, it may be a method of performing a first read out on charges of a first pixel included in a first line on a pixel array in the 1R3S method, skipping a read out on three periphery pixels on the periphery of the first pixel, and in response to the first read out on the first line, skipping a read out on the pixels included in three lines existing consecutively following the first line, and then performing a first read out on charges of the first pixel included in another line, and then skipping a read out on three periphery pixels on the periphery of the first pixel.

In such a skip method, the image sensor 310 performs a first read out on charges stored in some of the plurality of pixels 710 and outputs the same to the image processor 320. Accordingly, the image processor 320 may receive input of a first read out value of charges (PR) of the some pixels 710. Herein, the first read out value of charges (PR) of the some pixels 710 is a value of charges moved from the photo diode 311 of the some pixels 710 to the storage diode 313 and stored therein.

Leakage charges may flow into at least one of the first read pixels 710 during a second read out, and the charges stored in the photo diode 311 and the leakage charges may flow into the remaining pixels 720 during the second read out period.

Therefore, as illustrated in FIG. 7B, the image sensor 310 may perform a first read out on charges stored in the some pixels 710, and then performs a second read out on charges stored in each of the plurality of pixels. Accordingly, the image processor 320 may receive input of a value of charges (PI) regarding all charges including leakage charges stored in the remaining pixels 720 and a value of charges (PL) regarding pure leakage charges stored in the some pixels 730. Therefore, the image processor 320 may detect a pixel where the light leakage phenomenon has occurred based on the value of charges (PR) of the some pixels 720 that have been first read out, the value of charges (PL) of the some pixels 730 that have been second read out, and the value of charges (PI) of the remaining pixels 720 that have been second read out, and then perform a correction on an area corresponding to that detected pixel.

Figure 8A:
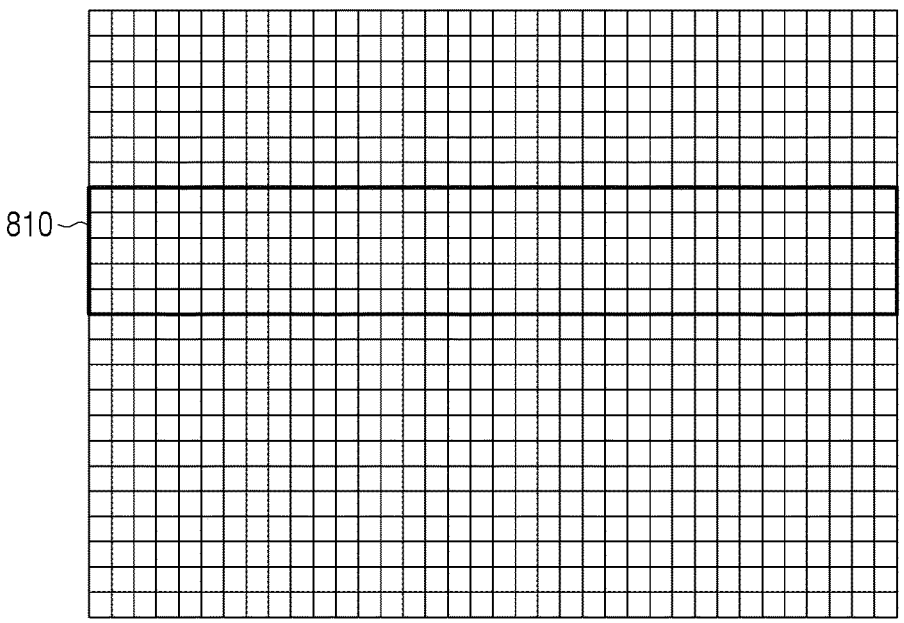
FIGS. 8A and 8B are exemplary views of charges stored in an image sensor being read out in a crop method in a photographing apparatus according to an exemplary embodiment.
Figure 8B:
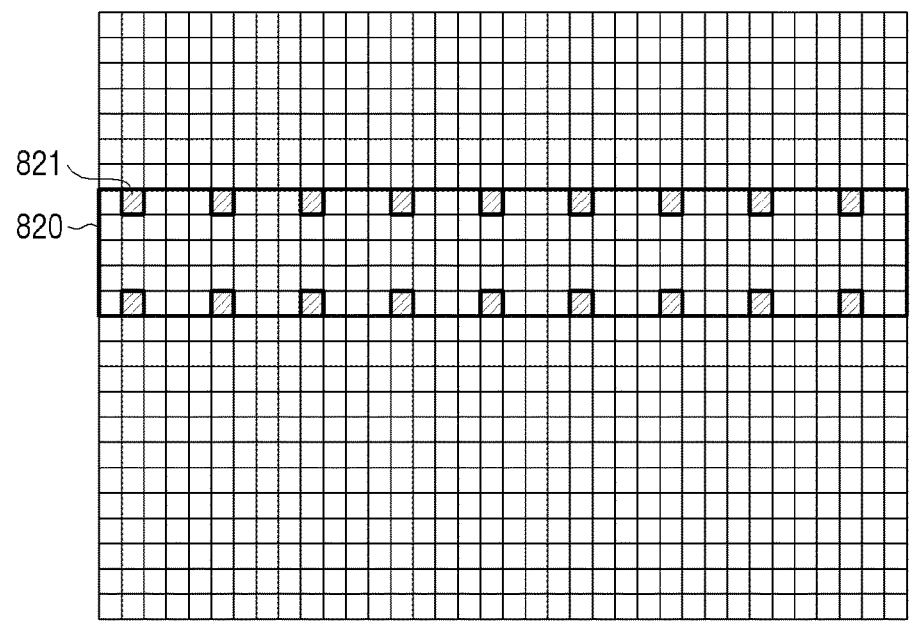

FIGS. 8A and 8B are exemplary views of charges stored in an image sensor being read out in a crop method in a photographing apparatus according to an exemplary embodiment.

As illustrated in FIG. 8A, the image processor 320 analyzes an image of the photographed subject or an illuminance value determined by the illuminance sensor 380, and determines whether or not a light source area exists. If it is determined that there is a light source in a first area 810 of the photographed subject, the image sensor 310 determines some pixels to be first read out in the crop method. As illustrated, if there is a light source in the first area 810 of the photographed subject, the image processor 320 may determine at least one pixel corresponding to the first area 810 where the light source exists and the remaining pixels included in the same line as the at least one pixel as some pixels to be first read out. When the some pixels are determined as aforementioned, the image sensor 310 consecutively performs a first read out on the charges stored in the some pixels per line, and consecutively performs a second read out on the charges stored in the plurality of pixels per line, and outputs the same to the image processor 320. Accordingly, the image processor 320 may detect a pixel where the light leakage phenomenon has occurred based on the value of charges (PR) of the some pixels that have been first read out, value of charges (PL) of the some pixels that have been second read out, and value of charges (PI) of the remaining pixels that have been second read out, and then perform a correction on the area corresponding to that detected pixel.

As illustrated in FIG. 8B, the image sensor 310 may perform a first read out on only the charges stored in pixels corresponding to the skip method of among the at least one pixel corresponding to the first area 820 where the light source exists and the remaining pixels included in the same line as the at least one pixel. For example, in a case of performing a first read out on charges stored in a pixel in 1R3S method, the image sensor 310 may perform a first read out on only the charges of some pixels 821 suitable to the 1R3S method of among the pixels corresponding to the first area 820 and outputs the same to the image outputter 320. When the first read out on the charges of the some pixels 821 suitable to the 1R3S is completed, the image sensor 310 may consecutively perform a second read out on charges stored in the plurality of pixels per line, and outputs the same to the image processor 320. Accordingly, the image processor 320 may detect pixels where the light leakage phenomenon has occurred based on the value of charges (PR) of some pixels that have been first read out, value of charges (PL) of some pixels that have been second read out, and value of charges (PI) of the remaining pixels that have been second read out, and perform a correction on the area corresponding to that detected pixel.

FIGS. 9A, 9B, and 9C are exemplary views illustrating movement of charges when read out in an image sensor of a photographing apparatus according to an exemplary embodiment.

As illustrated in FIG. 9A, the storage diode 313 of the first pixel to be first read out of among the plurality of pixels stores the charges 910 moved from the photo diode 311. Then, when a quick first read out is performed in a crop or skip method, the storage diode 313 of the first pixel transmits the charges 910 stored in the storage diode 313 to the floating diffusion node 315. Accordingly, as the charges 920 stored in the storage diode 313 are quickly read out after being transmitted to the floating diffusion node 315, the image sensor 310 may output a value of charges (PR) of image charges where there is no leakage charges to the image processor 320.

As illustrated in FIG. 9B, the storage diode 313 of the first pixel stores only the leakage charges 930 that flow in during the second read out. Then, when the second read out is performed, the storage diode 313 of the first pixel transmits the leakage charges 930 to the floating diffusion node 315. Accordingly, the charges 940 stored in the storage diode 313 are read out after being transmitted to the floating diffusion node 315, and thus the image sensor 310 may output only the value of charges (PL) regarding the leakage charges to the image processor 320.

Among the plurality of pixels, the storage diode 313 of the second pixel that has not been first read out stores the charges 950 including the charges moved from the photo diode 311 and the leakage charges that flow in during the second read out as shown in FIG. 9C. Then, when the second read out is performed, the storage diode 313 of the second pixel transmits the charges 950 including the leakage charges to the floating diffusion node 315. Accordingly, the charges 940 stored in the storage diode 313 are read out after being transmitted to the floating diffusion node 315, and thus the image sensor 310 may output the value of charges (PI) including the image charges and the leakage charges to the image processor 320.

FIGS. 10A and 10B are first exemplary views illustrating an area where the light leakage phenomenon has occurred based on a skip method in an image sensor of a photographing apparatus according to an exemplary embodiment.

As illustrated in FIG. 10A, the image sensor 310 performs a first read out one charges stored in some of the plurality of pixels according to the 1R3S method. As illustrated, first and second pixels 1010 and 1030 are pixels that a first read out are performed thereon. Third and fourth pixels 1020 and 1040 are on the periphery of the first and second pixels 1010 and 1030, respectively, and may be pixels on which only a second read out is performed. In such a case, the image processor 320 may receive input of a first value of charges (PR) regarding the first pixel and a second value of charges (PR) regarding the second pixel 1030 that have been first read out by the image sensor 310.

When the first read out regarding all the some of the pixels including the first and second pixels 1010 and 1030 is completed, the image sensor 310 performs a second read out on the charges stored in each of the plurality of pixels as illustrated in FIG. 10B. In such a case, the image processor 320 may receive input of a first value of charges (PL) regarding the first pixel 1010' and a second value of charges (PL) regarding the second pixel 1030' that have been second read out by the image sensor 310. Herein, the first value of charges (PL) and second value of charges (PL) may be values regarding leakage charges that flow into the first and second pixels 1010' and 1030' from which the charges have been removed according to the first read out during the second read out.

Therefore, the image processor 320 determines whether or not each of the first value of charges (PL) regarding the first pixel 1010' and the second value of charges (PL) regarding the second pixel 1030' exceed the first threshold value. If it is determined that the second value of charges (PL) regarding the second pixel 1030' exceeds the first threshold value, the image processor 320 detects the second pixel 1030' of among the first and second pixels 1010' and 1030' as a light leakage pixel where the light leakage phenomenon has occurred.

The image processor 320 may receive input of a third value of charges (PI) regarding the third pixel 1020' and a fourth value of charges (PI) regarding the fourth pixel 1040' that have been second read out by the image sensor 310. Herein, the third value of charges (PI) may be a value regarding image charges stored in the third pixel 1020', and the fourth value of charges (PI) may be a value regarding charges that include image charges stored in the fourth pixel 1040' and leakage charges that flow therein during the second lead out.

In such a case, the image processor 320 may determine whether or not the fourth pixel 1040' is a periphery pixel where the light leakage phenomenon has occurred based on the fourth value of charges (PI) of the fourth pixel 1040' and the first read out second value of charges (PR) of the second pixel 1030' on the periphery of the fourth pixel 1040'. In this way, the image processor 320 may detect a periphery pixel where a light leakage phenomenon has occurred of among a plurality of pixels, and as aforementioned, the image processor 320 may determine a correction value of charges regarding the periphery pixel where the light leakage phenomenon has occurred.

FIGS. 11A and 11B are second exemplary views illustrating an area where a light leakage phenomenon has occurred based on a skip method in an image sensor of a photographing apparatus according to another exemplary embodiment.

As illustrated in FIG. 11A, the image sensor 310 may perform a first read out on charges stored in some of the plurality of pixels according to the 2R4S method. As illustrated, a first group 1110 that includes a first to fourth pixels may be pixels to be first read out according the 2R4S method. In this case, the image processor 320 may receive input of a first to fourth value of charges (PR) regarding each of the first to fourth pixels of the first group 1110 that have been first read out by the image sensor 310.

When the first read out on all the some of the pixels including the first to fourth pixels of the first group 110 is completed, the image sensor 310 may perform a second read out on charges stored in each of the plurality of pixels, as illustrated in FIG. 11B. In such a case, the image processor 320 may receive input of a value of charges (PL) regarding each of the first to fourth pixels of the first group 1110' that have been second read out by the image sensor 310. Herein, the value of charges (PL) regarding each of the first to fourth pixels of the first group 1110' may be a value regarding leakage charges that flow into the first to fourth pixels of the first group 1110' from which all the charges have been removed according to the first read out during the second read out.

Therefore, the image processor 320 determines whether or not the second read out value of charges (PL) of each of the first to fourth pixels of the first group 1110' exceeds the first threshold value. If it is determined that the second read out value of charges (PL) of each of the first to fourth pixels of the first group 1110' exceeds the first threshold value, the image processor 320 may detect the first to fourth pixels of the first group 1110' as pixels where a light leakage phenomenon has occurred.

When the first to fourth pixels of the first group 1110' are detected as light leakage pixels, the image processor 320 may determine whether or not a periphery pixel is a pixel where a light leakage phenomenon has occurred based on a second read out value of charges (PI) of the periphery pixel on the periphery of the first to fourth pixels of the first group 1110', and the first read out first to fourth value of charges (PR) of each of the first to fourth pixel of the first group 1110'. In this way, the image processor 320 may detect a periphery pixel where a light leakage phenomenon has occurred of among the plurality of pixels, and as aforementioned, the image processor 320 may determine a correction value of charges regarding the periphery pixel where the light leakage phenomenon has occurred.

FIGS. 12A and 12B are exemplary views of determining a correction area regarding a light leakage area in an image sensor of a photographing apparatus according to an exemplary embodiment.

As illustrated in FIG. 12A, the image processor 320 may analyze the illuminance value measured by the illuminance sensor 380 and determine whether or not there exists a light source area in the photographed subject area 1210. If it is determined that there exists a light source area in the photographed subject area 1210, the image sensor 310 determines a first area 1211 that corresponds to the area where the light source area exists of among the plurality of pixels as the area where a light leakage phenomenon occurs. Then, the image sensor 310 consecutively performs a first read out on charges stored in each pixel of the first area 1210 per line according to the crop method, and outputs a value of charges (PR) regarding each pixel of the first area 1210 to the image processor 320.

Then, the image sensor 310 consecutively performs a second read out on charges stored in the plurality of pixels per line, and outputs a value of charges (PI) regarding the plurality of pixels to the image processor 320. When a value of charges (PI) of the plurality of pixels that have been second read out are input, the image processor 320 may determine a correction value of charges regarding each pixel of the first area 1311 based on a value of charges (PI) regarding the pixels of the first area 1311 that have been second read out, and a value of charges regarding each pixel of the first area 1311 that have been first read out.

As illustrated in FIG. 12B, the image processor 320 may analyze an image 1250 regarding the photographed subject and determine whether or not a light source area 1250 exists in the photographed subject. If it is determined that there is a light source area in the photographed subject area 1250, the image sensor 310 determines a first area 1351 corresponding to the area where the light source area exists in the plurality of pixels as an area where a light leakage phenomenon occurs. Then, the image sensor 310 consecutively performs a first read out on charges stored in each pixel of the first area 1251 per line in the crop method, and outputs a value of charges (PR) regarding each pixel of the first area 1251 to the image processor 320.

Then, the image sensor 310 consecutively performs a second read out on charges stored in the plurality of pixels per line, and outputs a light leakage value of charges (PI) regarding the plurality of pixels to the image processor 320. When a value of charges (PI) regarding the plurality of pixels that have been second read is input, the image processor 320 may determine a correction value of charges regarding each pixel of the first area 1251 based on a value of charges (PI) regarding a pixel of the first area 1251 that has been second read out and a value of charges (PR) regarding each pixel of the first area 1251 that has been first read out of among the value of charges (PI) of the plurality of pixels input.

FIGS. 13A and 13B are exemplary views of performing a read out in a case where a light leakage area does not exist in an image sensor of a photographing apparatus according to an exemplary embodiment.

As illustrated in FIG. 13A, when a light leakage area is detected in at least one pixel of among a plurality of pixels, the image sensor 310 performs a first read out on charges stored in some of the pixels of the plurality of pixels (hereinafter referred to as a first group of pixels), and performs a second read out on charges stored in each of the plurality of pixels.

When a light leakage area is not detected in at least one pixel of among the plurality of pixels, as illustrated in FIG. 13B, the image sensor 310 performs a first read out on charges stored in the first group of pixels, and performs a second read out on charges stored in remaining pixels of the plurality of pixel fro which the first group of pixels are excluded.

Specifically, when a value of charges (PR) of the first group of pixels is input, the image processor 320 determines whether or not each of the value of charges (PR) of the first group of pixels is less than a predetermined third threshold value. If it is determined that each of the value of charges (PR) of the first group of pixels is less than the third threshold value, the image processor 320 determines that a light source does not exist in the photographed subject. As such, when it is determined that a light source does not exist in the photographed subject, the image sensor 310 performs a second read out on charges stored in the remaining pixels of the plurality of pixels from which the first group of pixels are excluded, thereby reducing the time of performing a second read out on the charges stored in the plurality of pixels compared to FIG. 13A. The image processor 320 generates an image using a value of charges (PR) of the first group of pixels that have been first read out and a value of charges (PI) of the remaining pixels that have been second read out.

Hereinafter, a method for performing a light leakage correction in a photographing apparatus 300 will be explained in detail.

FIG. 14 is a flowchart of a method for performing a light leakage correction in a photographing apparatus according to an exemplary embodiment.

As illustrated in FIG. 14, the photographing apparatus 300 may analyze at least one of an image and an illuminance value measured by the illuminance sensor, and determine some pixels (hereinafter referred to as a first group of pixels) to be first read out of among the plurality of pixels included in the image sensor and the read out method to be applied to the first group of pixels (operation S1410). The first group of pixels may include one or more pixels.

For this purpose, the photographing apparatus 300 may analyze at least one of the image and the illuminance value measured by the illuminance sensor, and determines whether or not there exists a light source area that may be determined as a light leakage area. If it is determined that there exists a light source area that may be determined as a light leakage area, the photographing apparatus 300 determines the first group of pixels in the crop method. If it is determined that there does not exist a light source area that may be determined as a light leakage area, the photographing apparatus 300 determines the first group of pixels in the skip method. Herein, the photographing apparatus 300 may analyze at least one of the image and the illuminance value measured by the illuminance sensor, and determine the first group of pixels in one of various read skip methods such as a 1R3S method, a 1R5S method, a 1R2S method, a 1R4S method, a 2R2S method, and a 2R4S method.

When the first group of pixels is determined, the photographing apparatus 300 may perform a first read out on charges stored in the first group of pixels in the crop or skip method (operation S1420). When the first read out is completed, the photographing apparatus 300 may perform a second read out on charges stored in each of the plurality of pixels (operation S1430). Then, the photographing apparatus 300 may detect a pixel in which a light leakage phenomenon has occurred of among the plurality of pixels based on at least one of a value of charges (PR) of the first group of pixels that have been first read out, a value of charges (PI) of each of the plurality of pixels that have been second read out, and a value of charges (PL) of the first group of pixels that have been second read out, and perform a correction on an area corresponding to that detected pixel (operations S1440 and S1450).

Then, the photographing apparatus 300 may generate an image of the photographed subject using a value of charges of the light leakage pixel where the light leakage phenomenon has occurred and of the remaining pixels. (operation S1460).

Specifically, the photographing apparatus 300 may compare the second read out value of charges (PL) and a first threshold value of each of the first group of pixels that have been first read out. If the second read out value of charges (PL) of at least one pixel of the first group of pixels exceeds the first threshold value as a result of comparison, these pixels may be detected as light leakage pixels where a light leakage phenomenon has occurred. When at least one of the first group of pixels is detected as a light leakage pixel (hereinafter referred to as a first pixel), the photographing apparatus 300 may determine a first difference value between a second read out value of charges (PI) of a periphery pixel (hereinafter referred to as a second pixel) on the periphery of the first pixel detected as a light leakage pixel and a first read out value of charges (PR) of the first pixel. Then, the photographing apparatus 300 may determine whether or not a second difference between the first difference value and the second read out light leakage value of charges (PL) of the first pixel is less than the second threshold value. If the second difference is less than the second threshold value, the photographing apparatus 300 may determine the second pixel on the periphery of the first pixel as a periphery light leakage pixel in the light leakage phenomenon has occurred.

When the second pixel on the periphery of the first pixel is detected as a pixel where a light leakage phenomenon has occurred, the photographing apparatus 300 may determine a correction value of charges of the second pixel by deducting a predetermined difference value from the second read out value of charges (PI) of the second pixel detected as the periphery light leakage pixel. According to another exemplary embodiment, the photographing apparatus 300 may determine a correction value of charges of the second pixel by deducting the second read out value of charges (PL) of the first pixel from the second read out value of charges (PI) of the second pixel that has been detected as the periphery light leakage pixel.

According to an exemplary embodiment, if the second read out value of charges (PI) of the second pixel detected as the periphery light leakage pixel is equal to or greater than a third threshold value, the photographing apparatus 300 may determine the first readout value of charges (PR) of the first pixel on the periphery of the second pixel as a correction value of charges of the second pixel. For example, in an area corresponding to the second pixel of among the pixels detected as periphery light leakage pixels, more leakage charges may flow in compared to periphery pixels detected as light leakage pixels. In such a case, the image processor 320 may compare the second read out value of charges (PI) of the second pixel detected as the periphery light leakage pixel and the third threshold value, and if it is the same or above the third threshold value, the image processor 320 may determine the first read out value of charges (PR) of the first pixel on the periphery of the second pixel as a correction value of charges.

Then, the photographing apparatus 300 may generate an image using the first read out value of charges (PR), the correction value of charges of the periphery light leakage pixels, and the second read out value of charges (PI) of the remaining pixels besides the periphery light leakage pixels. Herein, the second readout out value of charges (PI) of the remaining pixels may be the value of charges not flowing into each storage diode 313 of each of the remaining pixels but moved from the photo diode 311 and stored.

If the first readout value of charges (PR) is less than a fourth threshold value, the photographing apparatus 300 may generate an image using the first readout value of charges (PR) and the second read out value of charges (PI) of the remaining pixels. Herein, the second read out value of charges (PI) of the remaining pixels may be value of charges moved from the photo diode 311 to the storage diode 313 of the remaining pixels and stored therein. That is, the second read out value of charges (PI) of the remaining pixels may be a value of charges (PR).

Specifically, if the first read out value of charges (PR) is less than the fourth threshold value, the photographing apparatus 300 may determine that leakage charges are not stored in the storage diode 313 of each of the plurality of pixels. Accordingly, the photographing apparatus 300 may generate an image using the first read out value of charges (PR) of the first group of pixels and the second read out value of charges (PI) of the remaining pixels without performing the aforementioned process of detecting whether or not there has occurred a light leakage phenomenon.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A photographing apparatus comprising:
   an image sensor comprising a plurality of pixels, and configured to:
      perform a first readout on charges stored in a group of pixels that is less than an entire portion of the plurality of pixels, at a first readout time; and
      perform a second readout on charges stored in the plurality of pixels, including the group of pixels, at a second readout time; and
   an image processor configured to:
      detect a pixel in which a light leakage occurs among the plurality of pixels, based on either one or both of a value of the first readout charges and a value of the second readout charges; and
      perform a correction on the detected pixel to generate an image.

2. The photographing apparatus according to claim 1, wherein the image processor is further configured to compare the second readout value of the group of pixels with a threshold value, and determine any one or any combination of the group of pixels as a light leakage pixel in which a light leakage occurs in response to the second readout value of the any one or any combination of the group of pixels exceeding the threshold value.

3. The photographing apparatus according to claim 2, wherein the image processor is further configured to determine a difference value between a second readout value of charges of a periphery pixel on a periphery of the light leakage pixel and a first readout value of charges of the light leakage pixel, and determine the periphery pixel as a periphery light leakage pixel in which a light leakage occurs based on the difference value and the second readout value of the light leakage pixel.

4. The photographing apparatus according to claim 3, wherein the image processor is further configured to determine a correction value to correct the second readout value of the periphery light leakage pixel by deducting the difference value from the second readout value of the periphery light leakage pixel or by deducting the second readout value of the light leakage pixel from the second readout value of the periphery light leakage pixel.

5. The photographing apparatus according to claim 4, wherein the image processor is further configured to generate an image based on the first readout value of the group of pixels, the correction value of the periphery light leakage pixel, and the second readout value of the plurality of pixels other than the periphery light leakage pixel.

6. The photographing apparatus according to claim 3, wherein the image processor is further configured to determine the first readout value of the light leakage pixel as a correction value of the periphery light leakage pixel in response to the second readout value of the periphery light leakage pixel being equal to or greater than another threshold value.

7. The photographing apparatus according to claim 3, wherein the image processor is further configured to, in response to the first readout value of the group of pixels being less than the threshold value, generate an image based on the first readout value of the group of pixels and the second readout value of charges of the plurality of pixels other than the group of pixels.

8. The photographing apparatus according to claim 2, further comprising an illuminance sensor configured to measure an illuminance value of a photographed subject;
   wherein the image processor is further configured to analyze the illuminance value to determine the group of pixels as pixels on which the first readout is to be performed.

9. The photographing apparatus according to claim 8, wherein the image processor is further configured to determine whether a light source area exists in an image of the photographed subject based on the illuminance value, determine the group of pixels in a crop method in response to the light source area existing, and determine the group of pixels in a skip method in response to the light source area not existing.

10. The photographing apparatus according to claim 9, wherein the image processor is further configured to analyze the illuminance value to determine a multiple readout on the group of pixels to perform the first readout in the skip method.

11. A method for light leakage correction of a photographing apparatus, the method comprising:
   performing a first readout on charges stored in a group of pixels that is less than an entire portion of a plurality of pixels, at a first readout time;
   performing a second readout on charges stored in the plurality of pixels, including the group of pixels, at a second readout time;
   detecting a pixel in which a light leakage occurs among the plurality of pixels, based on either one or both of a value of the first readout charges and a value of the second readout charges;
   performing a correction on the detected pixel to correct a value of charges stored in the detected pixel; and generating an image, based on the corrected value of the detected pixel and values of the charges stored in the plurality of pixels other than the detected pixel.

12. The method according to claim 11, wherein the detecting comprises comparing the second readout value of the group of pixels with a threshold value, and determining any one or any combination of the group of pixels as a light leakage pixel in response to the second readout value of the any one or any combination of the group of pixels exceeding the threshold value.

13. The method according to claim 12, wherein the detecting comprises determining a difference value between a second readout value of charges of a periphery pixel on a periphery of the light leakage pixel and a first readout value of charges of the light leakage pixel, and
determining the periphery pixel as a periphery light leakage pixel in which a light leakage occurs based on the difference value and the second readout value of the light leakage pixel.

14. The method according to claim 13, wherein the performing the correction comprises determining a correction value to correct the second readout value of the periphery light leakage pixel by deducting the difference value from the second readout value of the periphery light leakage pixel or by deducting the second readout value of the light leakage pixel from the second readout value of the periphery light leakage pixel.

15. The method according to claim 14, wherein the generating the image comprising generating the image based on the first readout value of the group of pixels, the correction value of the periphery light leakage pixel, and the second readout value of the plurality of pixels other than the periphery light leakage pixel.

16. The method according to claim 13, wherein the performing the correction comprises, in response to the second readout value of the periphery light leakage pixel being equal to or greater than another threshold value, determining a correction value of the periphery light leakage pixel based on the first readout value of the light leakage pixel.

17. The method according to claim 13, wherein the generating the image comprises, in response to the first readout value of each of the group of pixels being less than the threshold value, generating the image based on the first readout value of the group of pixels and the second readout value of the plurality of pixels other than the group of pixels.

18. The method according to claim 12, further comprising analyzing an illuminance value measured by an illuminance sensor and determining the group of pixels as pixels on which the first readout is to be performed.

19. The method according to claim 18, wherein the determining comprises determining the group of pixels in a crop method in response to a light source area being determined as existing in an image of a photographed subject based on the illuminance value, and determining the group of pixels in a skip method in response to the light source area being determined as not existing.

20. The method according to claim 19, wherein the determining comprises analyzing the illuminance value and determining a multiple read out on the group of pixels to perform the first readout in the skip method.

21. A method of generating an image, by a photographing apparatus, the method comprising:
determining an area of the image having an illuminance value greater than a illuminance threshold value as a crop area;
performing a first readout on a first group of pixels included in the crop area at a first readout time;
performing a second readout on the first group of pixels and a second group of pixels included in the crop area at a second readout time, the first group of pixels and the second group of pixels being alternately arranged;
detecting a light leakage pixel among the first group of pixels based on a comparison between a second readout value of the first group of pixels and a leakage threshold value; and
performing a correction on the light leakage pixel to correct the second readout value.

22. The method according to claim 21, wherein the performing the first readout is performed by a skip method in which the first group of pixels are read out and the second group of pixels are skipped.

23. The method according to claim 21, further comprising determining any one or any combination of the second group of pixels as a light leakage pixel based on a difference between a third readout value of the second group of pixels and a first readout value of the first group of pixels.

* * * * *